United States Patent [19]

Suda et al.

[11] Patent Number: 4,667,316
[45] Date of Patent: May 19, 1987

[54] INFORMATION RECORDING-REPRODUCING APPARATUS

[75] Inventors: Shigeyuki Suda, Tokyo; Yukichi Niwa, Narashino; Yasuo Ogino, Yokohama; Eigo Kawakami, Kawasaki; Mitsutoshi Ohwada, Yokohama, all of Japan

[73] Assignee: Canon Kabushiki Kaisha, Tokyo, Japan

[21] Appl. No.: 586,973

[22] Filed: Mar. 7, 1984

[30] Foreign Application Priority Data

Mar. 14, 1983 [JP] Japan ................................. 58-42004

[51] Int. Cl.⁴ ............................................. G11B 7/095
[52] U.S. Cl. ..................................... 369/44; 369/45; 369/46; 369/170; 250/201; 250/202
[58] Field of Search ................... 369/122, 121, 44, 45, 369/46, 110, 54; 250/201, 202, 578; 346/76 L

[56] References Cited

U.S. PATENT DOCUMENTS

| | | | |
|---|---|---|---|
| 3,969,575 | 7/1976 | Gerritsen | 369/45 |
| 3,983,317 | 9/1976 | Glorioso | 369/112 |
| 4,085,423 | 4/1978 | Tsunoda | 369/122 |
| 4,298,974 | 11/1981 | Tsunoda | 369/122 |
| 4,334,300 | 6/1982 | Arquie | 369/122 |

Primary Examiner—Alan Faber
Attorney, Agent, or Firm—Fitzpatrick, Cella, Harper & Scinto

[57] ABSTRACT

An information recording-reproducing apparatus provided with a first light beam for recording information on a recording medium and a monitoring second light beam for reproducing the recorded information simultaneously with the recording is characterized in that when only the reproduction of already recorded information is effected, a focus control signal or a tracking control signal is obtained by the use of the first light beam.

13 Claims, 4 Drawing Figures

INFORMATION RECORDING-REPRODUCING APPARATUS

BACKGROUND OF THE INVENTION

1. Field of the Invention

This invention relates to an apparatus for optically recording and reproducing information, and more particularly to an apparatus for recording and reproducing information such as video and audio signals in the form of concentric circles or in the form of a spiral on a recording medium having, for example, a planar recording surface by a light beam or recording and reproducing information on a medium such as a magnetic tape or the like by a light beam.

2. Description of the Prior Art

Apparatuses for recording various types of information on a recording medium by the use of a light beam and reading out the recorded information by the use of a light beam are known. Among these apparatuses, there are ones in which a monitoring light beam is provided discretely from a recording light beam to confirm whether information has been accurately recorded on the medium and the recorded information is immediately reproduced by the monitoring beam. Optical information recording apparatuses in which such a monitoring light beam is provided are disclosed in Japanese Laid-open Patent Application No. 3405/1977, Japanese Laid-open Patent Application No. 48504/1978, Japanese Laid-open Patent Application No. 163531/1981 and Japanese Laid-open Patent Application No. 17546/1983.

Of these publications, Japanese Laid-open Patent Application No. 48504/1978 shows that the monitoring light beam is utilized also as a light beam for the focus control during recording. Also, Japanese Laid-open Patent Application No. 17546/1983 shows that a part of the monitoring light beam is divided and tracking is effected by the divided light beam.

However, in the prior art, it has been only during recording that both of the recording light beam and the monitoring light beam are used and, as shown in Japanese Laid-open Patent Application No. 17546/1983, for example, it has been usual that during reproduction, the recording light source is not turned on and the recording light beam is not utilized. Accordingly, for example, in the case of Japanese Laid-open Patent Application No. 17546/1983, during reproduction, the focus control and the tracking control must be effected only by the monitoring light beam, and this has led to the cumbersomeness of the adjustment of the respective control systems and the problem of the crosstalk or the like between the focus control signal and the tracking control signal in the detecting system.

SUMMARY OF THE INVENTION

It is an object of the present invention to provide an information recording-reproducing apparatus which can efficiently and accurately effect recording and reproduction by a single optical head.

It is another object of the present invention to provide an information recording-reproducing apparatus in which adjustment of each of the focus control system and the tracking control system is simple.

It is still another object of the present invention to provide an information recording-reproducing apparatus in which the crosstalk between the focus control signal and the tracking control signal is reduced.

The present invention achieves the above objects by an information recording-reproducing apparatus provided with a first light beam for recording information on a recording medium and a monitoring second light beam for reproducing the recorded information simultaneously with the recording, characterized in that when only the reproduction of already recorded information is effected, a focus control signal or a tracking control signal is obtained by the use of the first light beam.

The invention will become more fully apparent from the following detailed description thereof taken in conjunction with the accompanying drawings.

DETAILED DESCRIPTION OF THE PREFERRED EMBODIMENTS

In the present invention, during reproduction, either a focus control signal (hereinafter referred to as the AF signal) or a tracking control signal (hereinafter referred to as the AT signal) is taken out from a recording light beam. From a light beam used as a monitoring light beam during recording, a signal not taken out from the recording light beam is taken out during reproduction, for example, the AT signal is taken out when the AF signal has been taken out from the recording light beam, and the AF signal is taken out when the AT signal has been taken out from the recording light beam. In the present invention, the time of recording refers to a case where information is recorded on a recording medium and is reproduced simultaneously with the recording to monitor the information, and the time of reproduction refers to a case where recording is not effected but already recorded information is reproduced.

During recording, the diameter of the monitoring beam spot on the recording medium is usually greater than the diameter of the recording beam spot and accordingly, during recording, it is preferable to take out the AF signal from the monitoring light beam. Therefore, where the diameter of the beam spot of the monitoring light beam is not varied during recording and during reproduction, it is preferable to take out the AF signal from the monitoring light beam during reproduction as well. Where the AT signal is taken out from the monitoring light beam during reproduction, it is desirable to make the diameter of the beam spot of the monitoring light beam small relative to the diameter of the beam spot during recording.

Further, in the apparatus according to the present invention, where a tracking guide comprising a groove or the like is provided in advance as the tracking during recording on the recording medium, it is possible to take out the AT signal from the reflected scattered light of the recording light beam. Also, where the tracking groove is not provided on the recording medium, the entire optical head may be placed on a precision feeding mechanism and recording at predetermined intervals may be effected by the feeding accuracy of this mechanism. An embodiment of the present invention will hereinafter be described in detail.

Figure 1:
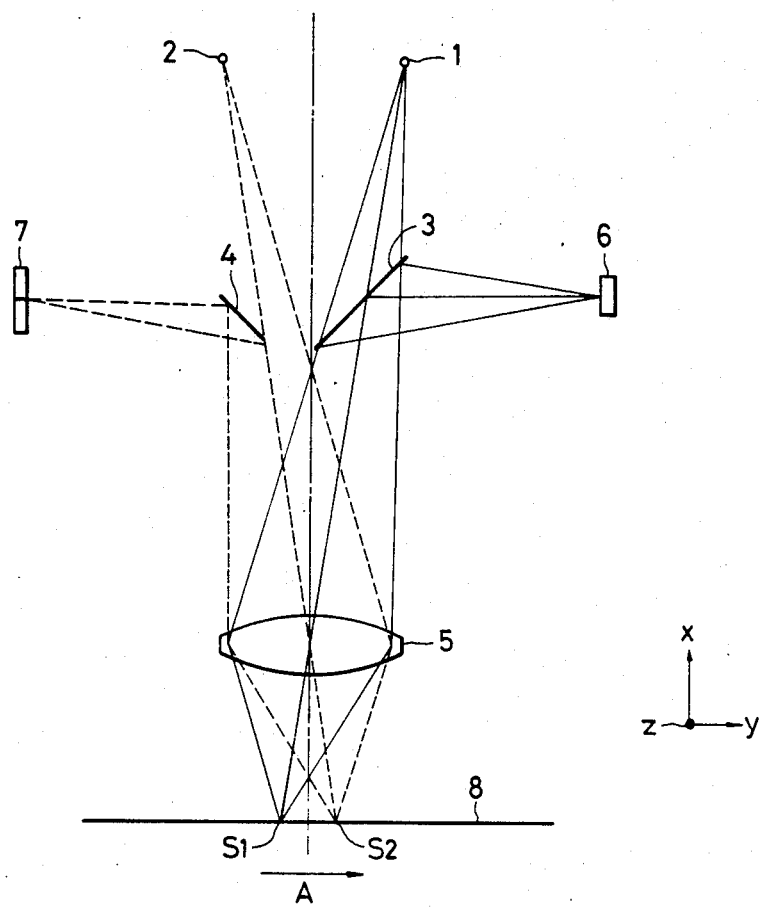
FIG. 1 is a schematic view showing an example of the construction of an optical head used in an apparatus according to the present invention.

FIG. 1 schematically shows an embodiment of the recording-reproducing optical head used in the apparatus according to the present invention. Reference numeral 1 designates a first semiconductor laser for generating a recording light beam during recording, reference numeral 2 denotes a second semiconductor laser light source for generating as a monitoring light beam a light beam of a wavelength different from that of the first light source during recording, reference numeral 3 designates a polarizing beam splitter, reference numeral 4 denotes a light-reflecting member, reference numeral 5 designates an objective lens, reference numeral 6 denotes a two-division sensor comprising two light-receiving elements disposed in a direction orthogonal to the plane of the drawing sheet (the direction of z-axis), reference numeral 7 designates a two-division sensor comprising two light-receiving elements disposed in the direction of x-axis in the plane of the drawing sheet, and reference numeral 8 denotes a recording medium movable in the direction of arrow A (the direction of y-axis). Accordingly, in FIG. 1, the objective lens 5 is movable in the direction of x-axis for focusing and movable in the direction of z-axis for tracking.

Figure 2:
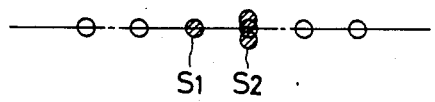
FIG. 2 shows the arrangement of beam spots on a recording medium by the optical head shown in FIG. 1.

The light beam from the semiconductor laser 1 passes through the polarizing beam splitter 3, whereafter it is condensed as a beam spot $S_1$ on the recording medium 8 by the objective lens 5. The light beam reflected and scattered by the surface of the recording medium 8 passes again through the objective lens 5, whereafter it is deflected by the polarizing beam splitter 3 and enters the sensor 6. The light beam from the semiconductor laser 2 is condensed as a beam spot $S_2$ on the recording medium by the objective lens 5. This beam spot $S_2$ is formed on the same track as the beam spot $S_1$ and at a position slightly spaced apart in the direction A of movement of the medium 8 relative to the beam spot $S_1$. The light beam reflected and scattered by the recording surface 8 passes through the objective lens 5, whereafter it is deflected by the light beam reflecting member 4 and enters the sensor 7. At this time, the effective diameter of the optical path is set so that there is provided an optical path in which the center of gravity of the light-projecting aperture on the surface of the pupil of the objective lens as viewed from the beam spot $S_2$ is not coincident with the center of gravity of the light-receiving aperture. As shown in FIG. 2, the shape of the monitoring beam spot $S_2$, as compared with the shape of the recording beam spot $S_1$, is an elliptical shape elongated in a direction perpendicular to the direction of movement of the beam spot relative to the recording medium.

In the optical head shown in FIG. 1, during recording, the differential signal from the two-division sensor 7 which receives the reflected and scattered light beam of the monitoring light beam is used as the AF signal. During reproduction, the differential signal from the two-division sensor 6 which receives the light beam from the beam spot $S_1$ is used as the AT signal and the differential signal from the two-division sensor 7 which receives the light beam from the beam spot $S_2$ is used as the AF signal. As the reproducing signal, use is made of the sum signal from the two-division sensor 6 or the sum signal from the two-division sensor 7.

Figure 3:
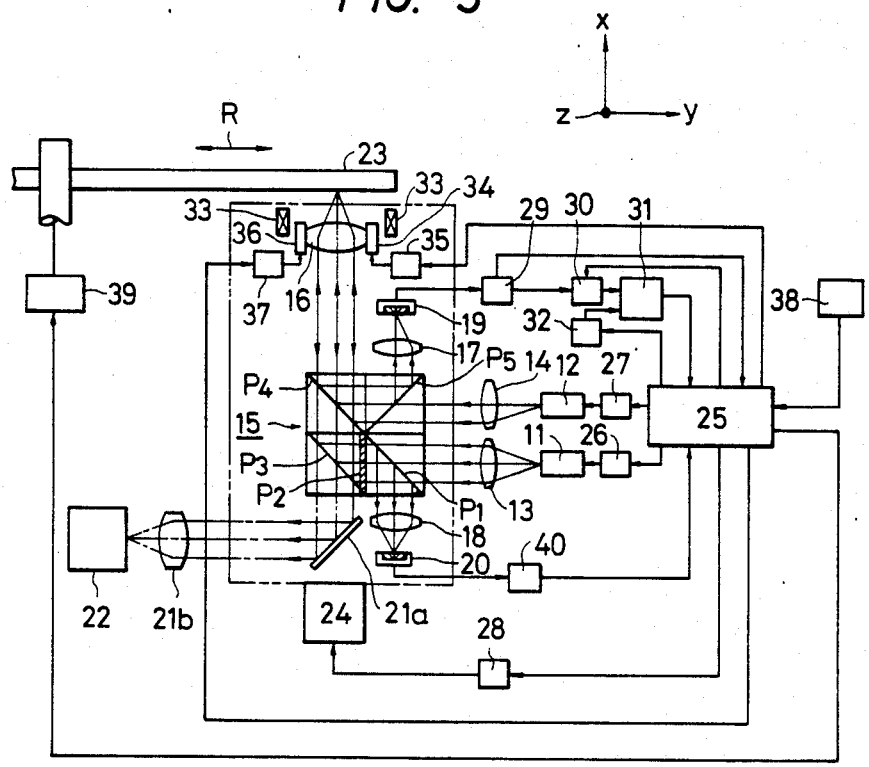
FIG. 3 is a schematic diagram showing an embodiment of the information recording-reproducing apparatus according to the present invention.
Figure 4:
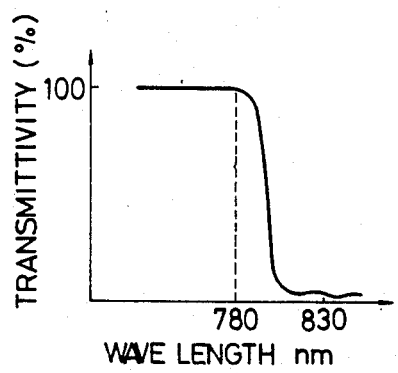
FIG. 4 is a graph showing the spectral transmittivity characteristic of an interference thin film provided in the apparatus shown in FIG. 3.

FIG. 3 is a schematic diagram showing an embodiment of the information recording-reproducing apparatus according to the present invention. In FIG. 3, reference numeral 11 designates a semiconductor laser which emits a recording light beam having, for example, a wavelength $\lambda_1$ of 780 nm and having its plane of polarization disposed so as to be P-polarized light relative to the reflecting surface $P_1$ of a prism to be described, reference numeral 12 denotes a semiconductor laser which emits a monitoring light beam having, for example, a wavelength $\lambda_2$ of 830 nm, reference numeral 13 designates a collimater lens for collimating the light beam from the semiconductor laser 11, and reference numeral 14 denotes a collimater lens for collimating the light beam from the semiconductor laser 12. Reference numeral 15 designates a prism block formed, for example, by eight equilateral-triangle-pole-shaped prisms. In this block, $P_1$ designates the surface of a polarizing beam splitter which transmits a P-polarized light beam therethrough and reflects an S-polarized light beam. $P_2$ denotes a phase correcting plate having the function of a quarter wave plate, $P_3$ designates a surface having the characteristic of reflecting a light beam of wavelength $\lambda_1$ (780 nm), and $P_4$ denotes a surface provided with an interference thin film designed so as to have a transmittivity characteristic which, as shown in FIG. 4, transmits a light beam of wavelength $\lambda_1$ (780 nm) but reflects a light beam of wavelength $\lambda_2$ (830 nm). The construction of such an interference thin film can be obtained easily by any person skilled in the art and therefore need not be described herein. $P_5$ designates shield means such as a reflecting surface provided to displace the center of gravity of the light-projecting aperture of a light beam of wavelength $\lambda_2$ relative to an objective lens to be described, with respect to the optic axis of the objective lens.

Reference numeral 16 designates an objective lens whose chromatic aberration is corrected for the aforementioned two wavelengths $\lambda_1$ and $\lambda_2$. Reference numerals 17 and 18 denote imaging lenses, reference numeral 19 designates a two-division sensor comprising two light-receiving elements disposed in the direction y in the plane of the drawing sheet, and reference numeral 20 denotes a two-division sensor comprising two light-receiving elements disposed in the direction y in the plane of the drawing sheet. Reference characters 21a, 21b, 22 designate a television observation system, 21a denoting a stationary reflecting mirror, 21b designating an imaging lens, and 22 denoting a TV observation device. This TV observation system is used for the position adjustment when this apparatus is assembled and, where the TV observation system is not used, the aforementioned surface $P_3$ is comprised of a total reflection surface, and where a TV monitor is used, most of the quantity of light of the light beam of wavelength $\lambda_1$ is reflected with the exception that the quantity of light required for a monitor TV is transmitted. Reference numeral 23 designates a disk-like recording medium (hereinafter sometimes referred to as the disk), and reference numeral 24 denotes a moving mechanism for moving the portion of the head encircled by dotted line in the radial direction of the disk 23 (the direction of arrow R).

Reference numeral 25 designates a central processing circuit, reference numerals 26 and 27 denote driving circuits for driving the semiconductor lasers 11 and 12, respectively, reference numeral 28 designates a driving circuit for driving the moving mechanism, reference numeral 29 denotes an amplifying circuit for amplifying the signal from the two-division sensor 19 and for forming the sum signal and the differential signal of the signals from the two light-receiving elements, reference numeral 30 designates a circuit for reproducing RF signal, reference numeral 31 denotes a comparison circuit, and reference numeral 32 designates a delay circuit for delaying the time required for the portion recorded by the spot $S_1$ as shown in FIG. 2 to arrive at the position of the spot $S_2$. Reference numeral 40 designates a circuit for taking and amplifying the differential signal of the signals from the two light-receiving elements of the two-division sensor 20. Reference numeral 33 denotes an auxiliary magnetic field generating circuit, reference numeral 34 designates a focusing actuator for moving the objective lens 16 for focusing, reference numeral 35 denotes a circuit for driving the actuator 34, reference numeral 36 designates a tracking actuator for moving the objective lens 16 for tracking, and reference numeral 37 denotes a circuit for driving the actuator 36. Reference numeral 38 designates a circuit for producing a recording signal, and reference numeral 39 denotes a driving circuit for rotating the disk 23.

First, during recording, a recording signal is input from the signal producing circuit 38 to the semiconductor laser driving circuit 26 through the central processing circuit 25 and drives the semiconductor laser 11 which generates a recording light beam. The light beam from the semiconductor laser 11 is made into a parallel light beam by the collimater lens 13 and enters the prism block 15. In the prism block, the light beam passes through the surface $P_1$ of the polarizing beam splitter, whereafter it is made into a circularly polarized light beam by the phase plate $P_2$, is reflected by the reflecting surface $P_3$ and passes through the surface $P_4$, and then exits from the prism block, and is imaged on the surface of the recording medium 23 by the objective lens 16, whereby the recording signal is recorded on the recording medium 23. The light beam reflected by the recording medium 23 enters the prism block again through the objective lens 16 and passes through the surface $P_4$, whereafter it is reflected by the surface $P_3$ and becomes a linearly polarized light polarized in a plane orthogonal to the plane of polarization of the forward-going light beam by the phase plate $P_2$ and is reflected by the surface $P_1$ of the polarizing beam splitter, and then exits from the prism block and is imaged on the sensor 20 by the imaging lens 18.

The monitoring light beam from the semiconductor laser 12 DC-oscillated by the laser driving circuit 27 is made into a parallel light beam by the collimater lens 14 and enters the prism block 15 and is reflected by the surface $P_4$, whereafter it exits from the prism block 15. The light beam having left the prism block 15 is imaged on the recording medium 23 by the objective lens 16. At this time, the optical system is set so that the position of the imaged spot slightly deviates in a direction orthogonal to the plane of the drawing sheet (the direction of the z-axis) relative to the position of the imaged spot of the light beam from the laser light source 11. The manner in which this imaged spot deviates has been described in connection with FIG. 2 and therefore need not be described here. The light beam reflected by the recording medium 23 enters the prism block 15 again through the objective lens 16 and is reflected by the surface $P_4$, whereafter it is again reflected by the surface $P_5$ and exits from the prism block 15, and then is imaged on the sensor 19 by the imaging lens 17. As previously described, the center of gravity of the light-projecting aperture of the light beam of wavelength $\lambda_1$ has been displaced with respect to the optic axis of the objective lens 16 and therefore, the principal ray (central ray) of the projected light beam enters the medium 23 at a certain angle with respect to the optic axis of the objective lens 16, i.e., the direction perpendicular to the surface of the recording medium. Thus, if the light beam from the semiconductor laser 12 is properly imaged on the surface of the recording medium 23, the quantities of light of the light beams entering the light-receiving elements of the two-division sensor 19 will be equal to each other, but if the light beam is out of focus on the surface of the recording medium 23, the principal ray reflected by the recording medium 23 will positionally deviate in the direction of the y-axis on the sensor 19 and the quantities of light of the light beams entering the light-receiving elements will differ from each other. Accordingly, by differentiating the outputs of these light-receiving elements, there can be obtained a focus error signal of the projected light beam relative to the surface of the recording medium.

Where a tracking guide is provided in advance on the recording medium 23, the signal from the two-division sensor 20 is a differential signal amplified by the circuit 40 and is input to the tracking driving circuit 37 through the central processing circuit 25 and, when a tracking error signal is input thereto, the tracking actuator 36 is driven to move the objective lens 16 for tracking.

On the other hand, as regards the signal from the two-division sensor 19, a focusing differential signal and a monitoring sum signal are formed by the circuit 29, and the differential signal is input to the focusing driving circuit 35 through the central processing circuit 25 and this driving circuit 35 drives the focusing actuator 34 in accordance with the input signal to thereby move the objective lens 16 for focusing. Also, the sum signal from the circuit 29 is input to the RF signal reproducing circuit 30 and the reproduced RF signal is input to the comparison circuit 31. Simultaneously therewith, a recording signal delayed by a predetermined time through the delay circuit 32 is input to the comparison circuit 31 from the central processing circuit 25, and the recording signal and a signal obtained by reproducing the information recorded on the basis of that recording signal are compared by the comparison circuit 31, whereby whether recording has been properly effected on the medium 23 is judged.

Also, the driving circuit 28 drives the moving mechanism 24 on the basis of the signal from the central processing circuit 25, whereby the portion of the head indicated by dotted line is moved by a predetermined amount in the radial direction R of the disk 23. Where a recording tracking groove is not provided in advance on the disk 23, the moving mechanism 24 feeds the head at a predetermined speed to thereby effect recording at predetermined intervals.

Next, during reproduction, the semiconductor laser 11 is changed over the low output DC oscillation and applies a light beam to the disk 23 through an optical system similar to that used during recording. Also, the reflected light beam from the disk 23 modulated by the recorded information is directed to the sensor 20 and tracking is effected by the differential signal from this sensor 20 via a circuit similar to that used during recording. Also, the light beam from the semiconductor laser 12 irradiates the disk 23 through an optical system similar to that used during recording, and the reflected light beam from the disk 23 modulated by the recorded information is directed to the sensor 19. The differential signal from the sensor 19 effects focusing via a circuit similar to that used during recording, while the sum signal from the sensor 19 is taken out as a reproducing signal from the circuit 29. Depending on the purpose, this signal is input as an input signal to a monitor TV, or as a recording signal to a recording apparatus such as a laser beam printer or an ink jet printer, or as a communication signal to a communication circuit such as facsimile.

Where the recording medium 23 is a medium adapted to record information by utilizing perpendicular magnetization, an analyzer is provided in front of the sensor 19 at a predetermined azimuth angle with respect to the direction of polarization of the projected light beam during reproduction, thereby detecting the recording signal.

The present invention is not restricted to the illustrated embodiment, but various applications thereof are possible without departing from the scope of the invention as defined in the appended claims. For example, in the above-described embodiment, during reproduction, the AF signal is obtained from the monitoring light beam and the AT signal is obtained from the recording light beam, but during reproduction, the AT signal and the AF signal may be taken out from the monitoring light beam and the recording light beam, respectively. To obtain the AT signal and the AF signal, other known focus detecting method or tracking detecting method may be used. For example, where the AF signal is to be obtained from the recording light beam, it is difficult in the method of the embodiment to obtain a signal of high intensity on the surface of the recording medium and therefore, it is desirable to use other focus detecting method such as the so-called astigmatism method.

In the embodiment, in order that the beam spot of the monitoring light beam larger than the recording light beam may be easily obtained, the wavelength of the monitoring light beam has been made longer than the wavelength of the recording light beam, but this is not restrictive. Also, as the means for combining and separating the recording light beam and the monitoring light beam, use may be made of not only the means utilizing the difference in wavelength as in the embodiment, but also other means using the difference in direction of polarization or the like. In the embodiment, the reproducing signal is obtained from the monitoring light beam, but in the present invention, during reproduction, it is possible to derive the reproducing signal from either light beam.

What is claimed is:

1. An information recording-reproducing apparatus comprising:
   means for generating a first light beam for recording information on a recording medium during a recording;
   means for generating a monitoring second light beam for reproducing the recorded information simultaneously with the recording;
   first detecting means for obtaining one of a focus control signal and a tracking control signal from the first light beam during a reproduction time when only reproduction of the recorded information is effected; and
   second detecting means for obtaining the other of the focus control signal and the tracking control signal from the second light beam during said reproduction time.

2. An information recording-reproducing apparatus according to claim 1, wherein when only reproduction is effected, a tracking control signal is obtained by the use of said first light beam and a focus control signal is obtained by the use of said second light beam.

3. An information recording-reproducing apparatus according to claim 2, wherein said focus control signal is obtained by causing said second light beam to enter so that the principal ray thereof forms a certain angle from a direction perpendicular to the surface of the recording medium and detecting the positional deviation of the reflected light thereof.

4. An information recording-reproducing apparatus according to claim 3, wherein the beam spot of said second light beam, as compared with the beam spot of said first light beam, is of an elliptical shape elongated in a direction perpendicular to the direction of movement of the beam spot relative to the recording medium.

5. An information recording-reproducing apparatus according to claim 2, wherein the beam spot diameter of said second light beam, as compared with the beam spot diameter of said first light beam, is large with respect to a direction perpendicular to the direction of movement of the beam spot relative to the recording medium.

6. An information recording-reproducing apparatus according to claim 1 or 2, wherein a focus control signal is obtained from said second light beam when information is recorded.

7. An information recording-reproducing apparatus according to claim 1 or 2, wherein said recording medium is provided with a tracking guide in advance, and a tracking control signal is obtained from said first light beam when information is recorded on said recording medium.

8. An information recording-reproducing apparatus according to claim 7, wherein a focus control signal is obtained from said second light beam when information is recorded.

9. An information recording-reproducing apparatus according to claim 1 or 2, wherein a reproducing signal is obtained from said second light beam when only reproduction is effected.

10. An information recording-reproducing apparatus according to claim 1 or 2, wherein said first light beam and said second light beam differ in wavelength from each other.

11. An information recording-reproducing apparatus according to claim 10, wherein the wavelength of said second light beam is longer than the wavelength of said first light beam.

12. An information recording-reproducing apparatus according to claim 1, wherein when only reproduction is effected, a focus control signal is obtained by the use of said first light beam and a tracking control signal is obtained by the use of said second light beam.

13. An information recording-reproducing apparatus according to claim 12, wherein the beam spot diameter of said second light beam when only reproduction is effected is smaller than the beam spot diameter thereof when recording of information is effected.

* * * * *